R. C. LIVESAY.
SECURING AND TIGHTENING BOLT.
APPLICATION FILED FEB. 7, 1916.
1,246,122.
Patented Nov. 13, 1917.
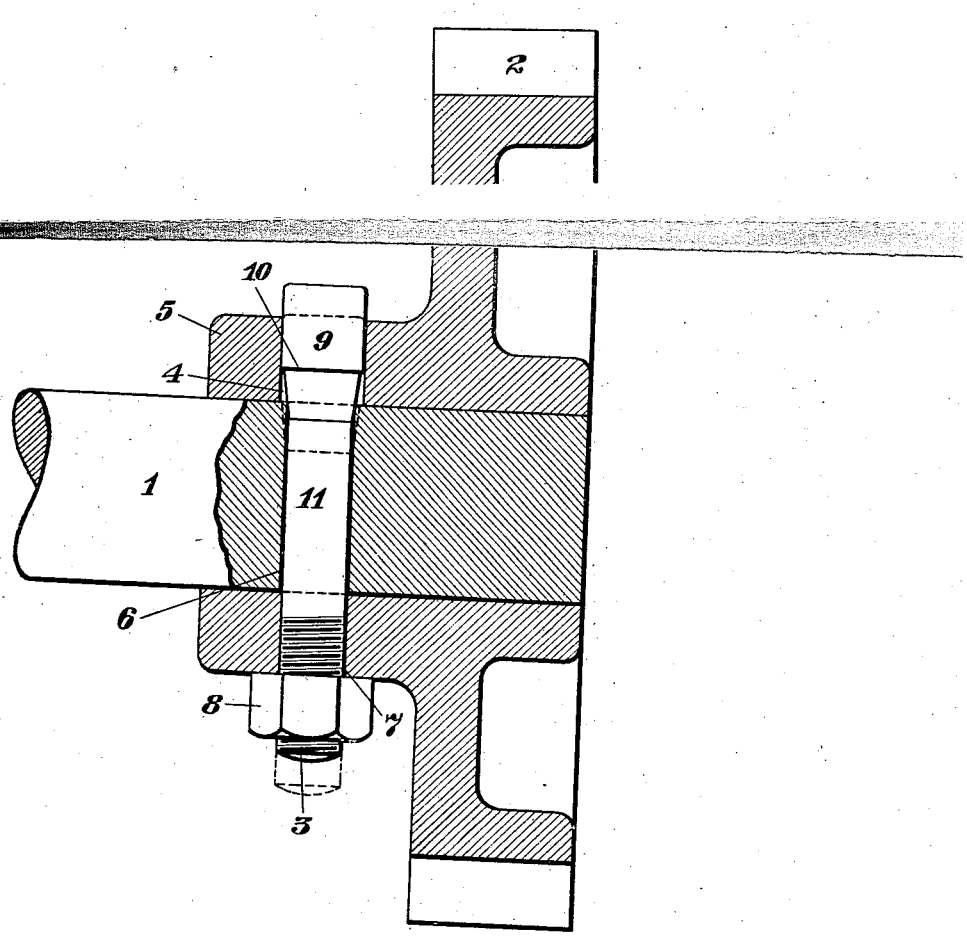

UNITED STATES PATENT OFFICE.

ROBERT C. LIVESAY, OF MOLINE, ILLINOIS, ASSIGNOR TO DEERE AND COMPANY, OF MOLINE, ILLINOIS, A CORPORATION OF ILLINOIS.

SECURING AND TIGHTENING BOLT.

1,246,122.  Specification of Letters Patent.  Patented Nov. 13, 1917.

Application filed February 7, 1916. Serial No. 76,689.

*To all whom it may concern:*

Be it known that I, ROBERT C. LIVESAY, a citizen of the United States, residing at Moline, in the county of Rock Island and State of Illinois, have invented certain new and useful Improvements in Securing and Tightening Bolts, of which the following is a specification, reference being had therein to the accompanying drawing.

My invention relates more particularly to means employed to secure to shafting, or the like, other mechanical parts in such a manner that any strain resulting is more evenly distributed and shearing action practically eliminated, as will be more clearly set forth hereinafter.

Referring to the drawing—

The figure is a sectional view of a gear wheel secured on a shaft in my improved manner.

As illustrated 1 is a shaft and 2 is a gear wheel in section mounted thereon and secured in place by a bolt or pin 3 which extends through a perforation 4 in the hub 5 of the gear wheel 2 then through a perforation 6 in the shaft 1 and a perforation 7 in the hub 5, the end of the bolt 3 being threaded to receive a nut 8 by which the bolt 3 is held in place.

The bolt 3 is formed with a head 9 adapted to fit freely in the perforation 4; from the head 9 the bolt 3 is frusto-conical in form, the base being of a smaller diameter than the head 9 so as to provide a shoulder 10 which is adapted to contact with the shaft 1 when the bolt 3 is driven fully into place, as shown in dotted lines in the drawing. The diameter of the perforation 6 in the shaft 1 and of the perforation 7 in the hub 5 is sufficient to permit the straight portion 11 of the bolt 3 to pass freely therethrough, the diameter of the perforation 6 being the same for the entire length of the latter.

In mounting a sleeve, a collar, or other part, or, as shown, a gear wheel 2, on the shaft 1, the perforations 4, 6 and 7 are alined and the bolt 3 is inserted and driven through until the threaded portion thereof is projected from the perforation 7 a sufficient distance for placing the nut 8 thereon; at this time the conical portion of the bolt 3 is in contact with the adjacent edge of the perforation 6. Continued driving of the bolt 3 will force the conical portion thereof into the perforation 6 spreading that part of it in contact with the conical portion of the bolt 3, and causing a swelling or upsetting of the surrounding metal of the shaft 1, forcing it against the adjacent inner surface of the hub 5, materially reducing any possible shearing action against the bolt 3 and securing the shaft 1 and gear wheel 2 more rigidly together; the shoulder 10 contacts with the shaft 1 and limits the distance the conical portion of the bolt 3 can be drawn into the perforation 6 so as to retain the head 9 of the bolt 3 in the perforation 4 of the hub 5.

The bolt 3 having been driven in until the shoulder 10 contacts with the shaft 1, the nut 8 is turned until it is jammed against the hub 5 and cannot be turned further, pressing that side of the hub 5 against the shaft 1 with considerable force. In the common use of tapered bolts, whether tapered for their entire length or for a portion of it only, the perforations in which such bolts are employed must be reamed, consequently, the advantages of my device, as shown and described, are not present.

What I claim is—

1. In a device of the class described, a shaft or the like having a transverse perforation for the reception of a bolt, a member encircling the shaft to be secured thereto and having opposite perforations to register with the perforation in the shaft, a bolt adapted to be driven through the perforations in said member and shaft, and having means to upset the metal of the shaft adjacent the perforation therein and in contact with said member when the bolt is driven into place.

2. In a device of the class described, a shaft or the like having a diametrical perforation for the reception of a bolt, a member encircling the shaft to be secured thereto and having opposite perforations to register with the perforation in the shaft, a bolt adapted to be driven through the perforations in said member and shaft to hold the two together, said bolt having means to upset the metal of the shaft adjacent the perforation therein and in contact with said member when the bolt is driven into place.

3. In a device of the class described, a shaft or the like having a diametrical perforation for the reception of a bolt, a member encircling the shaft to be secured thereto and having a perforation similar in diameter to the perforation in the shaft and registering therewith, a perforation in the opposite side of said member of greater diameter than the perforation in the shaft, a headed bolt adapted to be driven through the perforations in said member and shaft to hold the two together, the head of said bolt fitting within the larger perforation in said member, the bolt having means adjacent the head thereof to upset the metal of the shaft adjacent the perforation therein and the larger perforation in said member, when the bolt is driven into place.

4. In a device of the class described, a shaft or the like having a diametrical perforation of one diameter for the reception of a bolt, a member encircling the shaft to be secured thereto and having a perforation similar in diameter to the perforation in the shaft and registering therewith, said member having a perforation on its opposite side of greater diameter than the perforation in the shaft, a headed bolt adapted to be driven through the perforations in said member and shaft to hold the two together, the head of said bolt fitting within the larger perforation in said member, said bolt being frusto-conical in shape adjacent the head to upset the metal of the shaft against which it is driven and to force said upset metal against said member.

In testimony whereof I affix my signature, in presence of two witnesses.

ROBERT C. LIVESAY.

Witnesses:
JESSIE SIMSER,
W. G. DUFFIELD.

Copies of this patent may be obtained for five cents each, by addressing the "Commissioner of Patents, Washington, D. C."